United States Patent
Werner et al.

(10) Patent No.: US 10,470,246 B2
(45) Date of Patent: Nov. 5, 2019

(54) FIRST RADIO ACCESS NODE, A SECOND RADIO ACCESS NODE, A FIRST CORE NETWORK NODE AND METHODS THEREIN FOR PREPARING HANDOVER

(71) Applicant: TELEFONAKTIEBOLAGET LM ERICSSON (PUBL), Stockholm (SE)

(72) Inventors: Peter Werner, Linköping (SE); Stefan Engström, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 15/547,658

(22) PCT Filed: Feb. 2, 2015

(86) PCT No.: PCT/SE2015/050111
§ 371 (c)(1),
(2) Date: Jul. 31, 2017

(87) PCT Pub. No.: WO2016/126174
PCT Pub. Date: Aug. 11, 2016

(65) Prior Publication Data
US 2018/0027610 A1  Jan. 25, 2018

(51) Int. Cl.
*H04W 92/20* (2009.01)
*H04W 36/00* (2009.01)
(Continued)

(52) U.S. Cl.
CPC ....... *H04W 92/20* (2013.01); *H04W 36/0055* (2013.01); *H04W 36/34* (2013.01); *H04W 84/045* (2013.01); *H04W 92/14* (2013.01)

(58) Field of Classification Search
CPC ... H04W 92/20; H04W 92/14; H04W 84/045; H04W 36/34; H04W 36/0055
See application file for complete search history.

(56) References Cited

U.S. PATENT DOCUMENTS

2015/0264601 A1*  9/2015  Cha ............... H04W 36/0055
455/436

FOREIGN PATENT DOCUMENTS

EP    2 472 998 A1    7/2012
EP    2 528 387 A1    11/2012

OTHER PUBLICATIONS

International Search Report and Written Opinion issued in Application No. PCT/SE2015/050111 dated Nov. 17, 2015, 16 pages.
(Continued)

*Primary Examiner* — Jae Y Lee
(74) *Attorney, Agent, or Firm* — Sage Patent Group

(57) ABSTRACT

A method in a first radio access node for preparing handover of a user equipment in a wireless communications network. The user equipment is to be handed over from being served by the first radio access node to being served by a second radio access node. The first radio access node is connected to a first core network node currently serving the user equipment. Based on whether or not the second radio access node is connected to the first core network node the first radio access node selects (504) an interface for signalling handover of the user equipment among: a first interface interfacing the first radio access node and the first core network node, and a second interface. The second interface is an interface between the first radio access node and the second radio access node.

17 Claims, 12 Drawing Sheets

(51) Int. Cl.
H04W 36/34 (2009.01)
H04W 84/04 (2009.01)
H04W 92/14 (2009.01)

(56) References Cited

OTHER PUBLICATIONS

Huawei: "Exchange of S1 Interface Information between eNBs on X2", 3GPP TSG RAN WG3 Meeting #60; Kansas City, USA, May 5-9, 2008; R3-081157; Publication date: Apr. 30, 2008; 2 pages.
Nokia Siemens Networks, Nokia: "Signalling of MME Address in HO Request and X2 Setup", 3GPP TSG RAN WG3 Meeting #59; Sorrento, Italy, Feb. 11-15, 2008; R3-080194; Publication date: Feb. 6, 2008; 2 pages.
Huawei: "Specific cause value for X2 handover preparation failure", 3GPP TSG RAN WG3 Meeting #60; Kansas City, USA, May 5-9, 2008; R3-081158; Agenda Item: 10.2.10c; Publication date: Apr. 30, 2008; 2 pages.
3GPP TS 23.401 version 13.1.0 , 3rd Generation Partnership Project; Technical Specification Group Services and System Aspects; General Packet Radio Service (GPRS) enhancements for Evolved Universal Terrestrial Radio Access Network (E-UTRAN) access, Release 13, Dec. 2014, 310 pages.
ETSI TS 136 300 V12.3.0, LTE; Evolved Universal Terrestrial Radio Access (E-UTRA) and Evolved Universal Terrestrial Radio Access Network (E-UTRAN); Overall description; Stage 2 (3GPP TS 36.300 version 12.3.0 Release 12), Sep. 2014, 230 pages.
ETSI TS 136 423 V123.0, LTE; Evolved Universal Terrestrial Radio Access Network (E-UTRAN); X2 Application Protocol (X2AP); (3GPP TS 36.423 version 12.3.0 Release 12), Sep. 2014, 153 pages.
Extended European Search Report dated Dec. 11, 2017, issued for European patent application No. 15881329.5, 5 pages.
3GPP TSG RAN3 #61, R3-082192, Motorola, "Some open issues in S1 Handover routing and configuration", Jeju, Korea, Aug. 13, 2008, 2 pages.
3GPP TSG RAN3#60, R3-081118, Alcatel-Lucent, "Rejection Causes over X2", Kansas City, USA, Apr. 30, 2008, 2 pages.

\* cited by examiner

FIRST RADIO ACCESS NODE, A SECOND RADIO ACCESS NODE, A FIRST CORE NETWORK NODE AND METHODS THEREIN FOR PREPARING HANDOVER

CROSS REFERENCE TO RELATED APPLICATION(S)

This application is a 35 U.S.C. § 371 National Stage of International Patent Application No. PCT/SE2015/050111, filed Feb. 2, 2015, designating the United States, which is incorporated by reference.

TECHNICAL FIELD

Embodiments herein relate to a first radio access node, a second radio access node, a first core network node and methods therein for preparing handover of a user equipment.

BACKGROUND

In a typical radio communications network, communication devices, also known as mobile stations and/or User Equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

FIG. 1 illustrates a schematic example of the E-UTRAN comprising two eNBs, eNB1 and eNB2, and two Mobility Management Entities (MME), MME1 and MME2, in the Core Network (CN). The MME is used as a control node. For example, the MME is responsible for idle mode UE tracking and paging procedure including retransmissions. The MME is further involved in the bearer activation/deactivation process and is also responsible for choosing the serving gateway (SGW) for a UE at the initial attach and at time of intra-LTE handover involving CN node relocation. The MME is further responsible for authenticating the UE or user of the UE.

The two MMEs in FIG. 1 belong to an MME pool 1. An MME pool is a group of MMEs all connected to all eNBs in an MME pool area. The mobiles connected to each eNB may be served by different MMEs in the pool, to achieve load balancing between the MMEs and redundancy in case of MME unavailability.

Handover is an important aspect of any wireless communications network. In the text and some of the figures comprised herein handover is abbreviated with HO. With the handover the system tries to assure service continuity of the UE by transferring the connection between the communications network and the UE from one cell to another cell. When and to what cell the handover occurs depends on several factors such as signal strength of reference signals, load conditions in the cells, service requirements of the UE, etc. The provision of efficient and effective handovers, e.g. quantified by minimum number of unnecessary handovers, minimum number of handover failures, minimum handover delay, may affect not only the QoS of the end user such as the UE but also the overall mobile network capacity and performance.

In LTE, handover controlled by the communications network and assisted by the UE is utilized, for example described by 3GPP TS 36.300. The handover is based on UE reports. The UE is moved, if required and if possible, to the most appropriate cell that will assure service continuity and quality.

Handover is performed via a connection over an X2 interface between the eNB1 and the eNB2, whenever available. If the X2 is not available, handover is performed using a connection over an S1 interface between the eNB and the MME, i.e. involving the CN. The interfaces illustrated with full lines indicate that there is a functioning connection. The S1 interface between eNB2 and MME1 illustrated with a dashed-dotted line indicates that eNB2 is not S1-connected to MME1.

The handover procedure may be sub divided into three stages of preparation, also referred to as initiation, execution and completion.

The MME that serves the UE via the source eNB must also be connected to the target eNB as a prerequisite for X2 HO. The source eNB checks if this is the case by comparing what MME pools the currently serving MME belongs to with what MME pools the target eNB is connected to. In case the target eNB is connected to any of the MME pools to which the MME serving the UE belongs, the X2 HO may be chosen, otherwise S1 HO.

FIG. 1 shows an example of an inhomogeneous MME pool configuration. In this inhomogeneous MME pool configuration eNB2 is only S1 connected to a subset of the MMEs in the MME pool.

An inhomogeneous MME pool configuration may occur in the following scenarios:
Temporary S1-MME link failures
Faulty configuration of the MME pools
Transition phase when adding new MME to an existing MME pool. Not all eNBs may have established S1 connection to the new MME simultaneously.

For inhomogeneous MME pool configurations X2 HO may not be possible even though the target eNB is connected to an MME pool to which the MME serving the UE belongs.

Taking FIG. 1 as an example the source eNB1 may know that target eNB2 is connected to the MME pool to which MME1 belongs. MM1 is serving the UE to be handed-over and eNB1 selects X2 HO as the handover type. However at this time the S1 link between eNB2 and MME1 suffers from link failure which causes the X2 HO to fail with a cause set to unknown MME-code. Note that eNB2 is still connected to MME pool 1, since there is an S1-MME connection to MME2.

SUMMARY

An object of embodiments herein is to improve the performance of a wireless communication at handover.

According to a first aspect of embodiments herein, the object is achieved by a method in a first radio access node for preparing handover of a user equipment in a wireless communications network. The user equipment is to be handed over from being served by the first radio access node to being served by a second radio access node. The first radio access node is connected to a first core network node serving the user equipment.

Based on whether or not the second radio access node is connected to the first core network node the first radio access node selects an interface for signalling handover of the user equipment among:
a first interface interfacing the first radio access node and the first core network node, and
a second interface, which second interface is an interface between the first radio access node and the second radio access node.

According to a second aspect of embodiments herein, the object is achieved by a first radio access node for preparing handover of a user equipment in a wireless communications network. The user equipment is to be handed over from being served by the first radio access node to being served by a second radio access node when the first radio access node is connected to a first core network node serving the user equipment.

The first radio access node is configured to, based on whether or not the second radio access node is connected to the first core network node, select an interface for signalling handover of the user equipment among: a first interface interfacing the first radio access node and the first core network node, and a second interface. The second interface is an interface between the first radio access node and the second radio access node.

According to a third aspect of embodiments herein, the object is achieved by a method in a second radio access node for assisting a first radio access node in preparing handover of a user equipment in a wireless communications network. The user equipment is to be handed over from being served by the first radio access node to being served by the second radio access node. The first radio access node is connected to a first core network node serving the user equipment.

The second radio access node sends to the first radio access node, an identification of which core network nodes the second radio access node is connected to, enabling the first radio access node to prepare the handover of the user equipment.

According to a fourth aspect of embodiments herein, the object is achieved by a second radio access node for assisting a first radio access node in preparing handover of a user equipment in a wireless communications network. The user equipment is to be handed over from being served by the first radio access node to being served by the second radio access node when the first radio access node is connected to a first core network node serving the user equipment. The second radio access node is configured to send to the first radio access node an identification of which core network nodes the second radio access node is connected to, enabling the first radio access node to prepare the handover of the user equipment.

According to a fifth aspect of embodiments herein, the object is achieved by a method in a first core network node for assisting a first radio access node in preparing handover of a user equipment in a wireless communications network. The user equipment is to be handed over from being served by the first radio access node, to being served by a second radio access node. The first radio access node is connected to the first core network node serving the user equipment.

The first core network node receives from the first radio access node an identification of which core network nodes the second radio access node is connected to.

The first core network node further selects a second core network node as a target serving core network node, based on the identification of which core network nodes the second radio access node is connected to, enabling the first radio access node to prepare handover of the user equipment.

According to a sixth aspect of embodiments herein, the object is achieved by a first core network node for assisting a first radio access node in preparing handover of a user equipment in a wireless communications network. The user equipment is to be handed over from being served by the first radio access node, to being served by a second radio access node when the first radio access node is connected to the first core network node serving the user equipment.

The first core network node is configured to receive from the first radio access node an identification of which core network nodes the second radio access node is connected to.

The first core network node is further configured to select a second core network node as a target serving core network node, based on the identification of which core network nodes the second radio access node is connected to, enabling the first radio access node to prepare handover of the user equipment.

Since the first radio access node selects an interface for signalling handover of the user equipment based on whether or not the second radio access node is connected to the first core network node less link failure will occur at handover which results in that the performance of the wireless communication is improved at handover.

An advantage with embodiments herein is that they improve handover success rate in case of a temporary failure in the first interface, such as an S1 interface, between the second radio access node, such as a target eNB, and the first core network node, such as an MME.

Embodiments herein will prevent unnecessary X2 HO attempts in case of S1-MME failures on the target eNB. Instead other HO alternatives may be tried instead, such as Inter MME HO over S1.

Furthermore the embodiments enable the MME serving the source eNodeB to select a target MME that has S1 interface established towards the target eNodeB.

Also, as soon as an S1-MME connection is re-established and signalled over X2, X2 HO into this eNB may immediately be used again for the UEs served by the MME to which the connection was broken.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed. LTE will be used as an example of a wireless communications network in which the problem may arise.

Neighbour eNBs exchange information over the X2 interface between the eNBs about all the MME pools to which the eNB is connected. The information may be exchanged in the X2 SETUP procedure comprising the X2 Setup request message and the X2 setup response message. The information may also be exchanged in the ENB CONFIGURATION UPDATE procedure, comprising the eNB configuration update message and the eNB configuration acknowledge message.

This information—among other criteria—shall be used by the eNB to determine if an X2 Handover is possible. The MME that serves the UE in the source MME must also be connected to the target eNB as a prerequisite for X2 HO. The source eNB checks if this is the case by comparing what MME pools the currently serving MME belongs to with what MME pools the target eNB is connected to. In case the target eNB is connected to any of the MME pools to which the MME serving the UE belongs, the X2 HO may be chosen, otherwise S1 HO.

As mentioned above, for inhomogeneous MME pool configurations X2 HO may not be possible even though the target eNB is connected to an MME pool to which the MME serving the UE belongs.

Figure 1:
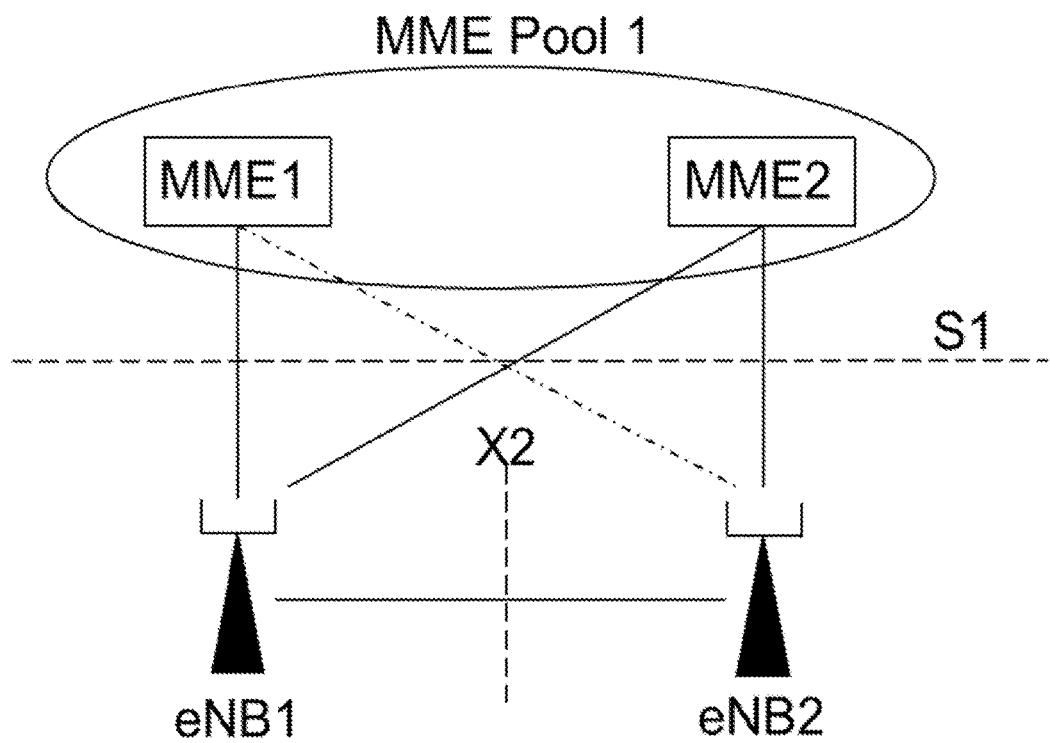
FIG. 1 is a schematic block diagram illustrating a wireless communications network with an MME pool.

Taking FIG. 1 as an example the source eNB1 may know via X2 the information described above that target eNB2 is connected to the MME pool to which MME1 belongs. MM1 is serving the UE to be handed-over and eNB1 selects X2 HO as the handover type. However at this time the S1 link between eNB2 and MME1 suffers from link failure which causes the X2 HO to fail with a cause set to unknown MME-code. Note that eNB2 is still connected to MME pool 1, since there is an S1-MME connection to MME2.

In prior art there it is not possible for the eNB1 to detect such a condition before the first HO attempt and it is especially not possible for the eNB1 to detect that the eNB2 has re-established the S1 link again.

Further, when an MME selects a target MME in prior art, the selection function performs a simple load balancing between the possible target MMEs. However, there are no means for the source MME that performs the selection to be aware of an S1-MME failure to the target eNodeB. Hence there is a probability that the source MME selects a target MME that has no S1-MME to the target eNodeB. Such selection will result in a handover failure.

Embodiments herein enhances a common MME pool information exchanged over the X2 interface with additional granularity about which MMEs from the pool are currently serving the eNB.

Embodiments herein may add optional Information Elements (IE) to the 3GPP TS 36.423 X2 SETUP and ENB CONFIGURATION procedures. In particular embodiments herein suggest adding a list of MME codes per MME pool to which the eNB is currently connected.

Based on this added information, the source eNB is able to determine that the target eNB does not have a functioning S1 interface to the source MME even though the target eNB is in the same MME pool area as the source eNB.

Furthermore the embodiments herein provide assistance information for a target MME selection in case of a S1 handover towards an eNode that has limited S1 connectivity within a given MME pool.

Embodiments herein will improve handover success rate in case of a temporary S1 failure in the target eNB.

A number of exemplary embodiments will now be illustrated in more detail. It should be noted that the following embodiments are not mutually exclusive. Components from one embodiment may be tacitly assumed to be present in another embodiment and it will be obvious to a person skilled in the art how those components may be used in the other exemplary embodiments.

Figure 2:
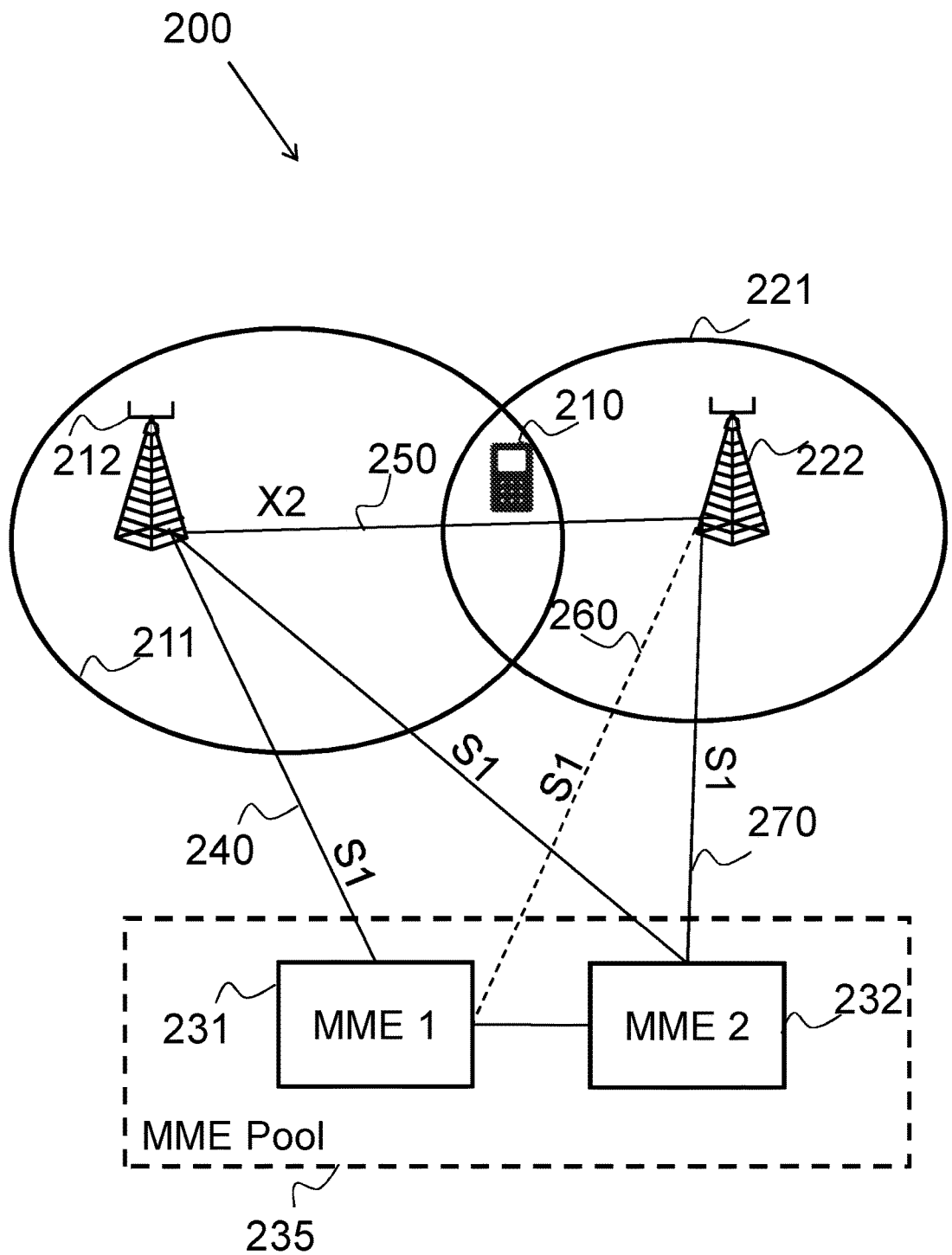
FIG. 2 is a schematic block diagram illustrating further details of a wireless communications network with an MME pool.

Embodiments herein may be implemented in one or more wireless communications networks whereof FIG. 2 depicts parts of a wireless communications network 200, also known as radio communications network, a telecommunications network or similar. The wireless communications network 200 comprises one or more Radio Access Networks (RAN) and one or more Core Networks (CN). The wireless communication network 200 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (Wi- Max), or Ultra Mobile Broadband (UMB), just to mention a few possible implementations. The wireless communication network 200 is exemplified herein as an LTE network.

In the wireless communication network 200, a user equipment 210, is configured to communicate via a RAN to one or more CN. The user equipment 210 is also known as a mobile station, wireless device, a user equipment and/or a wireless terminal. It should be understood by the skilled in the art that "user equipment" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

The wireless communications network 200 covers a geographical area which is divided into cell areas, e.g. a first cell 211 being served by a first radio access node 212 and a second cell 221 being served by a second radio access node 222. The first radio access node 212 and the second radio access node 222 may each be a base station, which may also be referred to as a radio base station and e.g. a NodeB, an evolved Node B (eNB, eNode B), a base transceiver station, Access Point Base Station, base station router, or any other network unit capable of communicating with the user equipment 210 within the cell 211 served by the first radio access node 212 depending e.g. on the radio access technology and terminology used.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 211 uniquely in the whole wireless communication network is also broadcasted in the cell 211. The first radio access node 212 communicates over the air or radio interface operating on radio frequencies with the user equipment 210 within range of the first radio access node 212. The user equipment 210 transmits data over the radio interface to the first radio access node 212 in Uplink (UL) transmissions and the first radio access node 212 transmits data over an air or radio interface to the user equipment 210 in Downlink (DL) transmissions.

The wireless communications network 200 further comprises core network nodes, such as a first core network node 231 and a second core network node 232. The first core network node 231 and the second core network node 232 may each be an MME.

The first core network node 231 and the second core network node 232 may each be comprised in a pool 235 of core network nodes. Embodiments herein are specifically targeting a scenario in which the first radio access node 212 and the second radio access node 222 each are connected to the pool 235 of core network nodes comprising both the first core network node 231 and the second core network node 232. In other words, the first radio access node 212 and the second radio access node 222 are comprised in the same pool area of the pool 235 of core network nodes.

The nodes in the wireless communications network 200 are capable of communicating with each other via different interfaces. For example, the first radio access node 212 may be connected via a first interface 240, such as an S1 interface, to the first core network node 231. The first radio access node 212 may also be connected via a second interface 250, such as an X2 interface, to the second radio access node 222.

FIG. 2 further illustrates further interfaces between the radio access nodes and the core network nodes. The interfaces illustrated with full lines in FIG. 2 indicate that there is a functioning connection. A third interface 260 between the second radio access node 222 and the first core network node 231 illustrated with a dashed-dotted line indicates that the second radio access node 222 is not directly connected to, i.e. is not able to communicate directly with, the first core network node 231 via the third interface 260. A fourth interface 270 between the second radio access node 222 and the second core network node 232 is illustrated with a full line.

In some embodiments, when the second interface is available, handover of the user equipment 210 between the first cell 211 and the second cell 221 is performed via a connection over the second interface 250 between the first radio access node 212 and the second radio access node 222.

If the second interface 250 is not available, handover may be performed using a connection over the first interface 240, i.e. involving the CN.

As mentioned above some embodiments herein enhances information about the pool 235, such as the common MME pool information, exchanged over the second interface 250, such as the X2 interface, with additional granularity about which core network nodes, e.g. which MMEs, from the pool 235 are currently serving the radio access node, such as the eNB.

Figure 3:
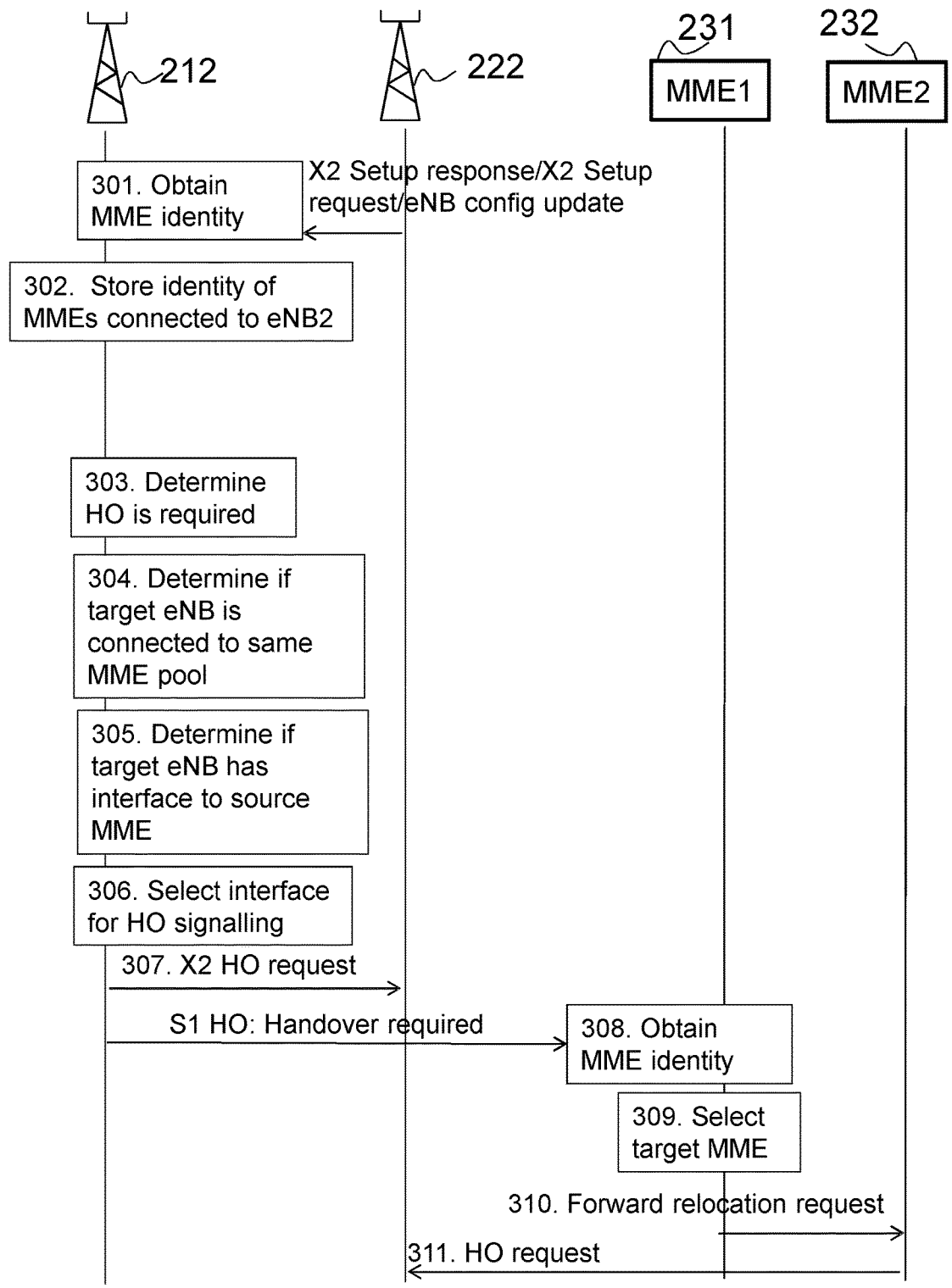
FIG. 3 is a combined signalling diagram and flowchart illustrating embodiments of methods herein.

FIG. 3 is a combined signalling diagram and flow chart that describes actions that may take place for preparing handover of the user equipment 210 in the wireless communications network 200 according to embodiments herein. The user equipment 210 is to be handed over from being served by the first radio access node 212 to being served by the second radio access node 222. As mentioned above the first radio access node 212 is connected to the first core network node 231 serving the user equipment 210.

The first radio access node 212 and the second radio access node 222 may each be connected to the pool 235 of core network nodes 231, 232.

The first radio access node 212 has access to information about which core network nodes it is connected to, i.e. which core network nodes that it has a functioning interface to. Likewise, second radio access node 212 has access to information about which core network nodes it is connected to. Thus an exchange of information about which core network nodes the first radio access node 212 is connected to and which core network nodes the second radio access node 222 is connected to may take place in order for the radio access nodes to determine whether a target radio access node is connected to a serving, or source, MME. The information exchange may take place long before the moment in time when the source radio access node needs to select the interface for signalling handover.

Action 301

As mentioned above the second radio access node 222 has access to information about which core network nodes it is connected to, i.e. which core network nodes that it has a functioning interface to. Therefore the second radio access node 222 may identify the core network nodes it is connected to and send such identification to the first radio access node 212.

The second radio access node 222 may for example send the identification of which core network nodes 232 the second radio access node 222 is connected to in any one or more out of: an X2 Setup request, an X2 Setup response and an eNB configuration update 408.

Thus in this action the first radio access node 212 obtains the identification of which core network nodes 232 the second radio access node 222 is connected to.

Naturally, the first radio access node 212 may also send an identification of which core network nodes 231 the first radio access node 222 is connected to, e.g. in any one or more out of: an X2 Setup request, an X2 Setup response and an eNB configuration update to the second radio access node 122.

This action is related to actions 403*a*, 401*b*, 405, and 502 below.

Action 302

When the first radio access node 212 has received the identification of which core network nodes 232 the second radio access node 222 is connected to it may store the identification or a corresponding identity of those core network nodes for future use, e.g. in a memory of the first radio access node 212. If the second radio access node 122 sends an updated identification, e.g. in an eNB configuration update, of which core network nodes 232 the second radio access node 222 is connected to, the first radio access node 212 may overwrite the old identification or identity. In this way the first radio access node 212 will have up-to-date information about which core network nodes 232 the second radio access node 222 is connected to.

This action is related to actions 404*a*, 402*b* and 406 below.

Action 303

After some time the first radio access node 212 determines that handover is required for the user equipment 110 and that the second radio access node 122 is a target radio access node of the handover.

Action 304

In order to perform handover preparation the first radio access node 212 may determine whether or not the first radio access node 21 and the second radio access node 122 each is connected to the same pool 235 of core network nodes, e.g. the same MME pool.

In embodiments herein the determining of whether or not the first radio access node 212 and the second radio access node 222 each is connected to the same pool 235 of core network nodes may be used as a first preliminary selection action.

This action is related to action 601 below.

Action 305

The first radio access node 212 may determine whether or not the second radio access node 222 is connected to the first core network node 231 based on the identification of which core network nodes 232 the second radio access node 222 is connected to.

This action is related to action 503 below.

Action 306

Based on whether or not the second radio access node 222 is connected to the first core network node 231 the first radio access node 212 selects an interface for signalling handover of the user equipment 210 among: the first interface 240 interfacing the first radio access node 212 and the first core network node 231, and the second interface 250 between the first radio access node 212 and the second radio access node 222.

When the second radio access node 222 is connected to the first core network node 231, the first radio access node 212 selects the second interface 250 for signalling handover of the user equipment 210.

When the second radio access node 222 is not connected to the first core network node 231, the first radio access node 212 selects the first interface 240 for signalling handover of the user equipment 210. By selecting the first interface 240 for signalling handover of the user equipment 210 when the second radio access node 222 is not connected to the first core network node 231, handover failure is avoided.

This action is related to actions 504 below.

Action 307

When the first radio access node 212 has selected the second interface 250 for signalling handover of the user equipment 210 the first radio access node 212 sends a request to handover, e.g. an X2 HO request, to the second radio access node 222 over the second interface 250.

This action is related to action 505 below.

Action 308

In some embodiments when the second radio access node 222 is not connected to the first core network node 231, the first radio access node 212 sends to the first core network node 231 the identification of which core network nodes 232 the second radio access node 222 is connected to. The identification of which core network nodes 232 the second radio access node 222 is connected to may for example be sent in a request to handover, e.g. an S1 HO required, to the first core network node 231 over the first interface 250. The first radio access node 212 sends the identification of which core network nodes 232 the second radio access node 222 is connected to in order for the first core network node 231 not to select a target serving core network node without a connection to the second radio access node 122 in action 309.

The identification may for example be sent as a list of all core network nodes which the second radio access node is connected to, e.g. over the S1-MME interface.

The identification may for example comprise the MME Codes of the core network nodes which the second radio access node is connected to. The MME Code is an 8-bit number identifying an MME within an MME pool. The MME identified by the MME Code is uniquely identified by the Globally Unique MME Identity (GUMMEI). Other possibilities for the identification may be GUMMEI or the GroupId together with the MMEC. The identification may be comprised in an IE, e.g. termed MMEC List.

This action is related to actions 505 below.

Action 309

The first core network node 231 selects a second core network node 232 as a target serving core network node.

A selection function may select an available core network node for serving the user equipment. The selection may be based on network topology, i.e. the selected core network node serves the location of the user equipment and for overlapping core network node service areas. The selection may prefer core network nodes with service areas that reduce the probability of changing the core network node in the future.

In embodiments herein the first core network node 231 selects a second core network node 232 as a target serving core network node based on the identification of which core network nodes 232 the second radio access node 222 is connected to. This is done in order to avoid a handover failure due to that the target serving core network node has no functioning interface or connection to the target radio access node, i.e the second radio access node 222.

This action is related to actions 1002 below.

Action 310

The first core network node 231 may send a request to handover to the selected target core network node, e.g. the second core network node 232.

Action 311

The selected target core network node may send a handover request to the second radio access node 222.

Further Details of Embodiments

Figure 4A:
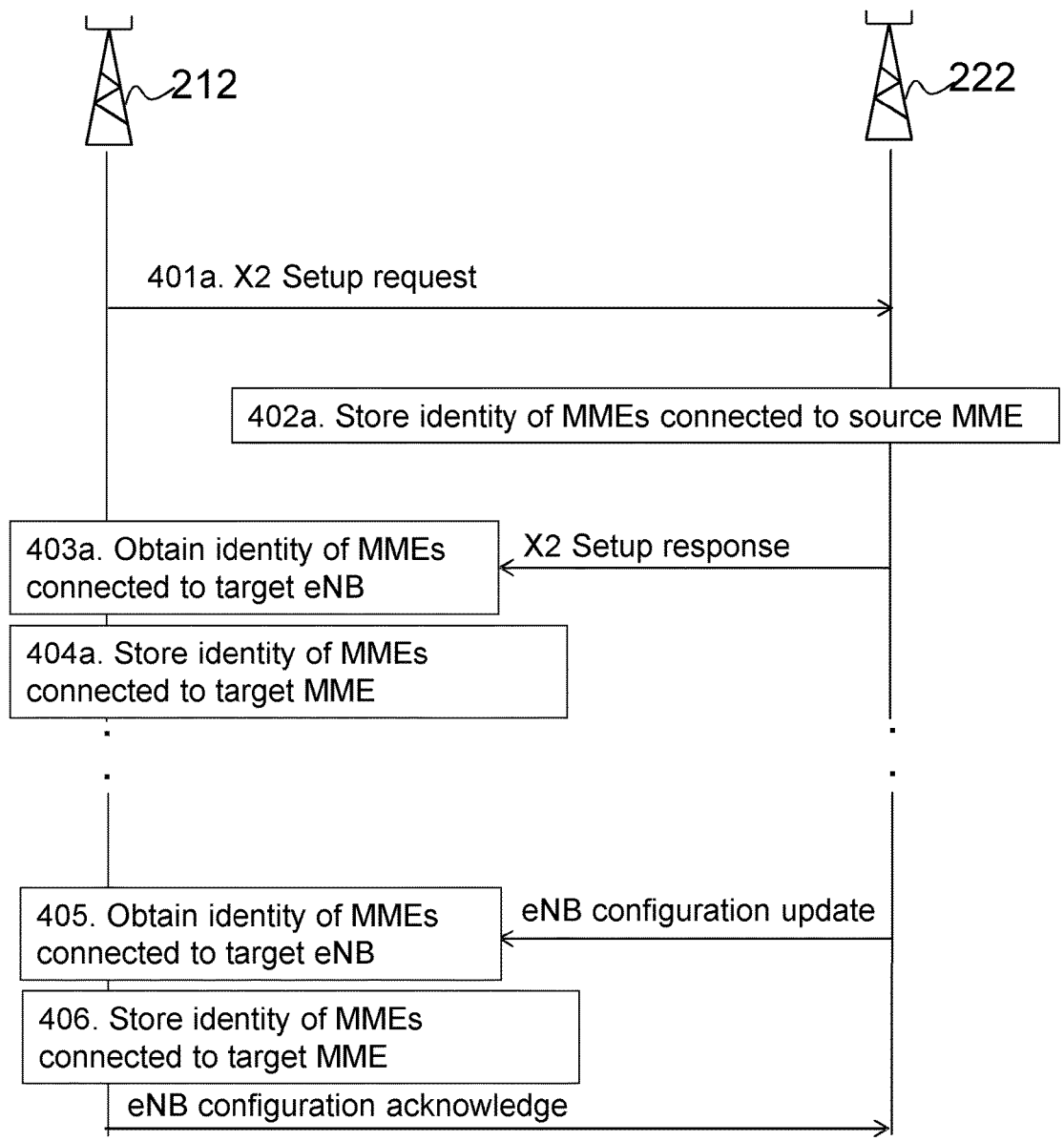
FIG. 4a is another combined signalling diagram and flowchart illustrating further embodiments of methods herein.
Figure 4B:
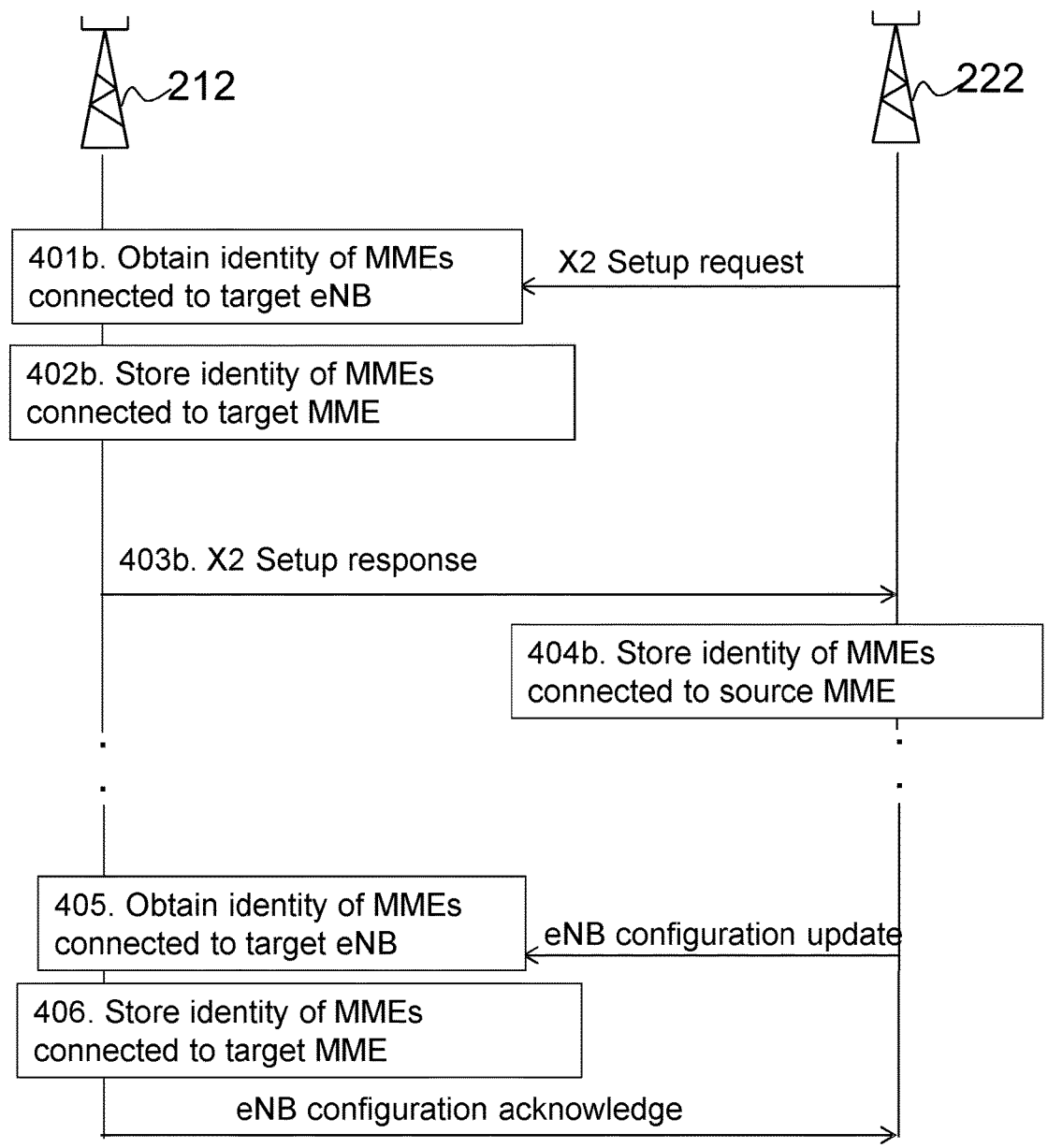
FIG. 4b is another combined signalling diagram and flowchart illustrating further embodiments of methods herein.

FIG. 4a and FIG. 4b illustrate some different possibilities for the first radio access node 212 to obtain the identification of which core network nodes 232 the second radio access node 222 is connected to.

In some first embodiments illustrated in FIG. 4a the first radio access node 212 first sends 401a an X2 Setup request to the second radio access node 222. The X2 Setup request may comprise an identification of which core network nodes 231 the first radio access node 212 is connected to.

The second radio access node 222 may store 402a the identification of which core network nodes 231 the first radio access node 212 is connected to.

The first radio access node 212 then receives 403a an X2 Setup response comprising the identification of which core network nodes 232 the second radio access node 222 is connected to.

The first radio access node 212 may store 404a the identification of which core network nodes 232 the second radio access node 222 is connected to.

Later the second radio access node 222 may send 405 an eNB configuration update with an updated identification of which core network nodes 232 the second radio access node 222 is connected to. This may be valuable if an S1-MME connection which was not functional, such as the third interface 260, is re-established for some reason. Then handover over the second interface 250, such as X2 HO, into the second radio access node 222 may immediately be used again for the user equipment 210 served by the first core network node 231 to which the connection was broken.

The first radio access node 212 may store 406 the updated identification of which core network nodes 232 the second radio access node 222 is connected to. To finish the eNB configuration update procedure the first radio access node 212 may send an eNB configuration acknowledge to the second radio access node 222.

In some second embodiments illustrated in FIG. 4b the first radio access node 212 first receives 401b an X2 Setup request from the second radio access node 222. The X2 Setup request may comprise the identification of which core network nodes 232 the second radio access node 222 is connected to.

The first radio access node 212 may store 402b the identification of which core network nodes 232 the second radio access node 212 is connected to.

The first radio access node 212 then sends 403b an X2 Setup response. The X2 Setup response may comprise the identification of which core network nodes 231 the second radio access node 222 is connected to.

The second radio access node 212 may store 404b the identification of which core network nodes 231 the first radio access node 212 is connected to.

Actions 405 and 406 are the same in FIG. 4b as in FIG. 4a.

Figure 5:
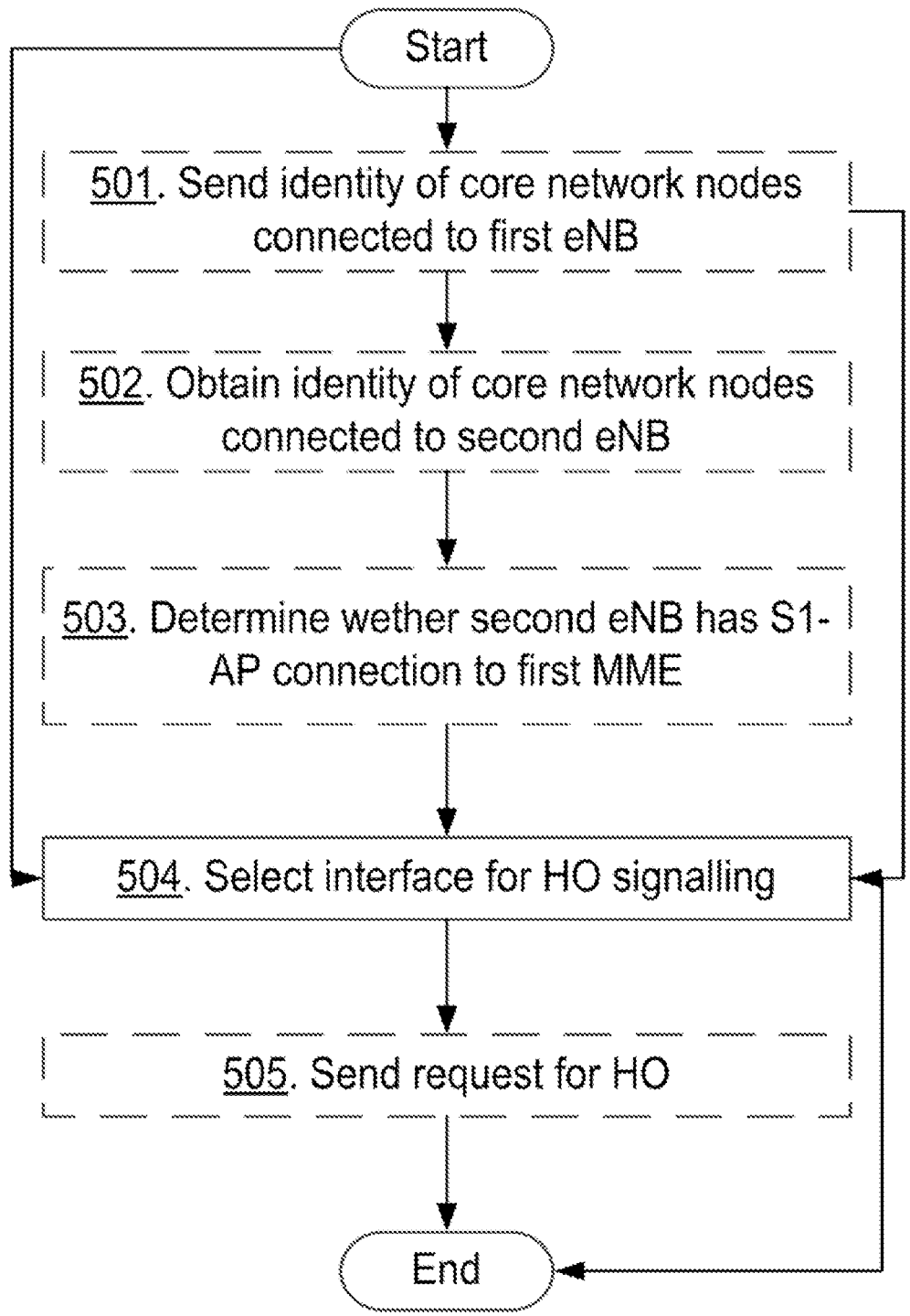
FIG. 5 is a flowchart illustrating embodiments of a method in a first radio access node.

FIG. 5 is a flow chart that illustrates embodiments of a method in the first radio access node 212 for preparing handover of the user equipment 210 in the wireless communications network 200. As mentioned above, the user equipment 210 is to be handed over from being served by the first radio access node 212 to being served by the second radio access node 222. Further, the first radio access node 212 is connected to the first core network node 231 serving the user equipment 210.

The first radio access node 212 and the second radio access node 222 may each be connected to the pool 235 of core network nodes. In other words, the pool 235 of core network nodes comprises the first core network node 231 and the second core network node 232.

The method comprises the following actions, which actions may be taken in any suitable order.

Action 501

The first radio access node 212 may send the identification of which core network nodes 231 the first radio access node 212 is connected to, e.g. in any one or more out of: an X2 Setup request, an X2 Setup response and an eNB configuration update to the second radio access node 222.

This action is related to action 801 below.

Action 502

In some embodiments the first radio access node 212 obtains an identification of which core network nodes 232 the second radio access node 222 is connected to.

Obtaining the identification of which core network nodes 232 the second radio access node 222 is connected to may comprise receiving the identification of which core network nodes 232 the second radio access node 222 is connected to from the second radio access node 222, e.g. in any one or more out of: an X2 Setup request, an X2 Setup response and an eNB configuration update.

This action is related to actions 301 and 803.

Action 503

In some embodiments the first radio access node 212 determines whether or not the second radio access node 222 is connected to the first core network node 231 based on the obtained identification.

This action is related to actions 304.

Action 504

Based on whether or not the second radio access node 222 is connected to the first core network node 231 the first radio access node 212 selects an interface for signalling handover of the user equipment 210 among: the first interface 240 interfacing the first radio access node 212 and the first core network node 231, and the second interface 250 between the first radio access node 212 and the second radio access node 222.

When the second radio access node 222 is connected to the first core network node 231, the first radio access node 212 selects the second interface 250 for signalling handover of the user equipment 210.

When the second radio access node 222 is not connected to the first core network node 231, the first radio access node 212 selects the first interface 240 for signalling handover of the user equipment 210.

This action is related to actions 306.

Action 505

In some embodiments when the second radio access node 222 is not connected to the first core network node 231, the first radio access node 212 sends to the first core network node 231 the identification of which core network nodes 232 the second radio access node 222 is connected to.

The identification of which core network nodes 232 the second radio access node 222 is connected to may for example be sent in a request to handover, e.g. an S1 HO required, to the first core network node 231 over the first interface 250. The first radio access node 212 sends the identification of which core network nodes 232 the second radio access node 222 is connected to in order for the first core network node 231 not to select a target serving core network node without a connection to the second radio access node 122 in action 309.

This action is related to actions 308 and 1001.

Figure 6:
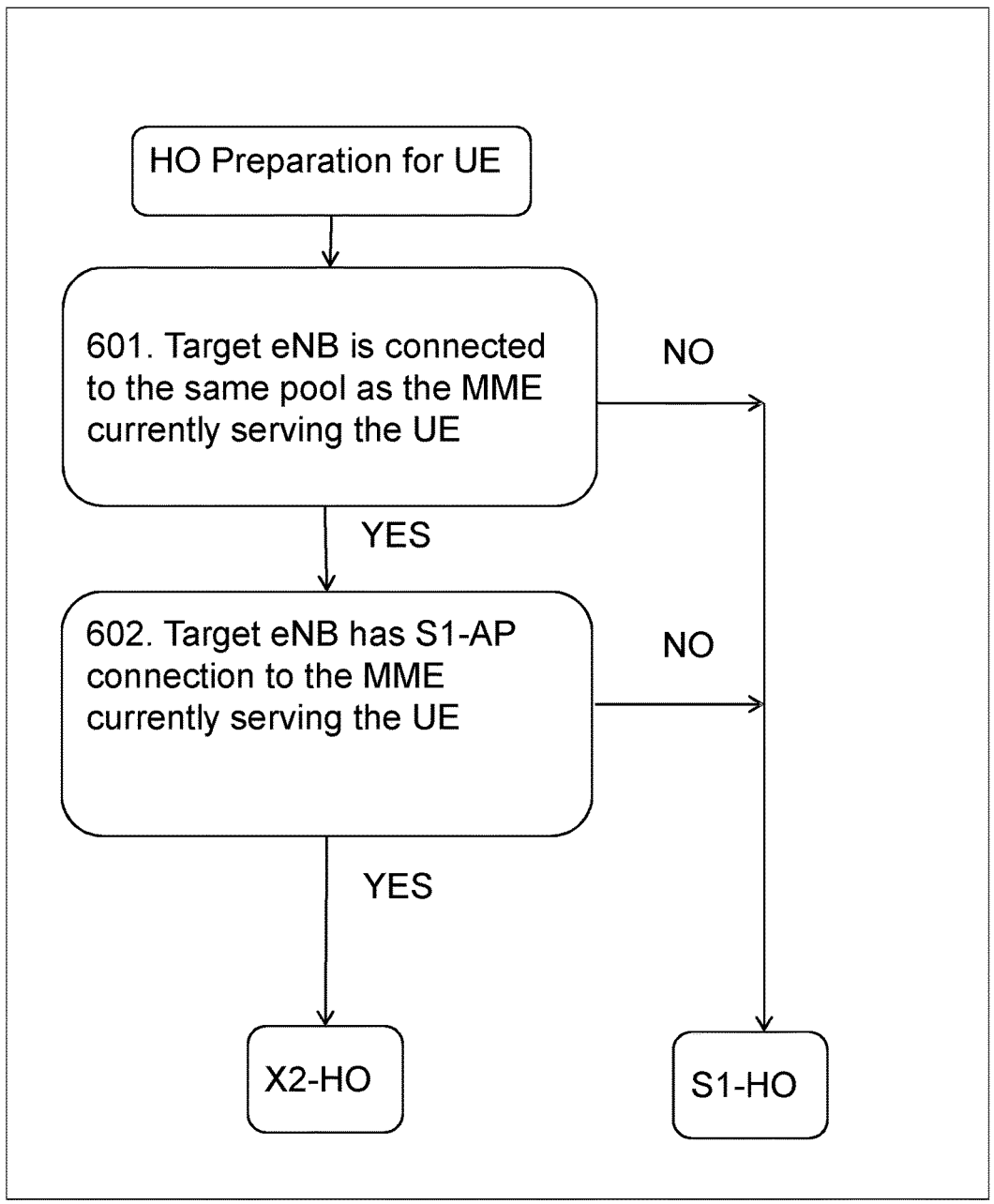
FIG. 6 is a flowchart illustrating further embodiments of a method in a first radio access node.

FIG. 6 illustrates some further details about how the first radio access node 212 may select which interface to use for the handover. In action 601 the first radio access node 212 determines whether or not the target eNB, i.e. the second radio access node 222, is connected to the same pool as the first core network node 231 serving the user equipment 210. In action 602 the first radio access node 212 determines whether or not target eNB, i.e. the second radio access node 222, has S1-AP connection to the first core network node 231 serving the user equipment 210.

Figure 7:
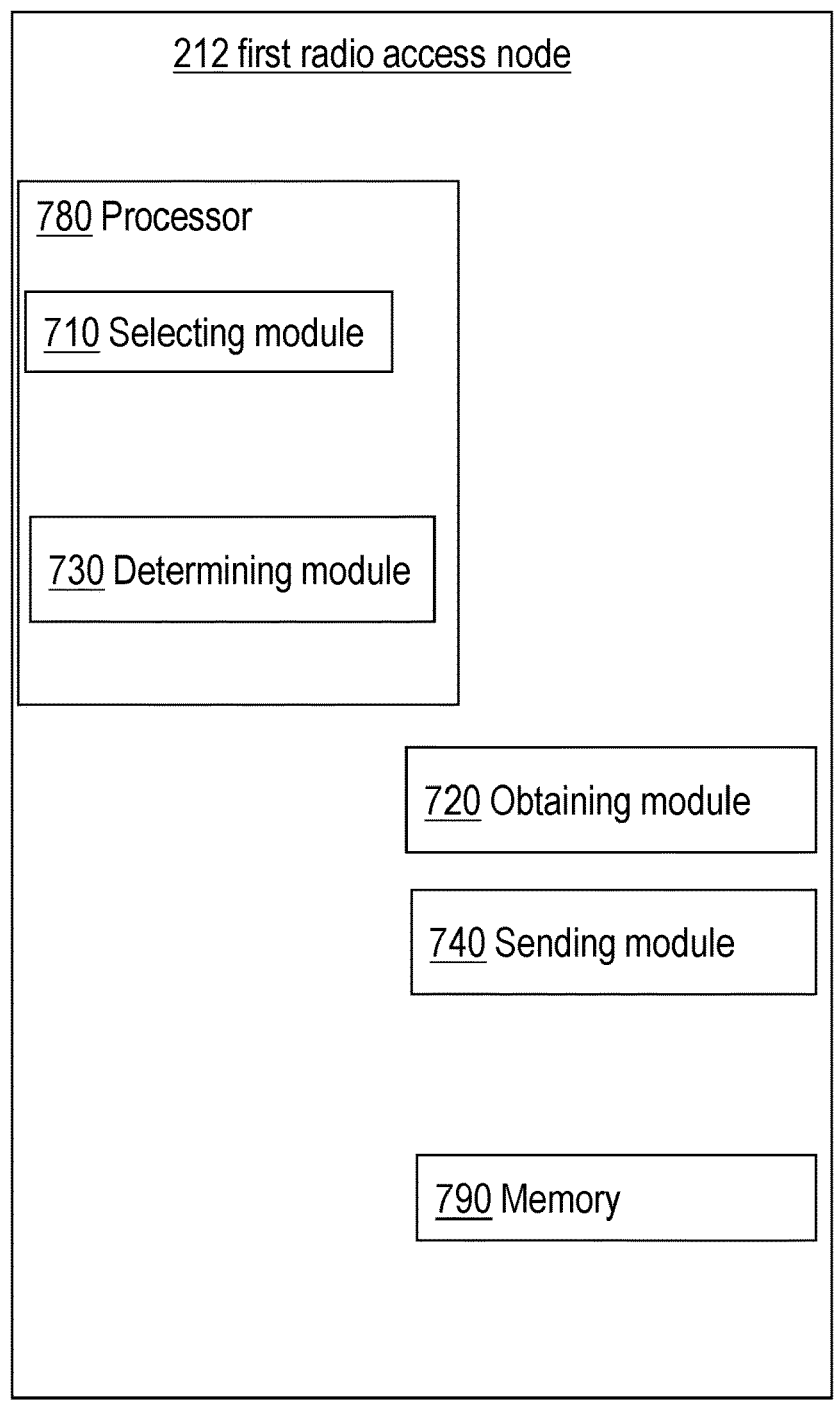
FIG. 7 is a schematic block diagram illustrating embodiments of a first radio access node.

To perform the method actions for preparing handover of the user equipment 210 in the wireless communications network 200 described above in relation to FIG. 5 and FIG. 6, the first radio access node 212 comprises the following arrangement depicted in FIG. 7.

As mentioned above, the user equipment 210 is to be handed over from being served by the first radio access node 212 to being served by the second radio access node 222 when the first radio access node 212 is connected to the first core network node 231 serving the user equipment 210.

The first radio access node may be configured to perform the method actions for preparing handover of the user equipment 210 when the first radio access node 212 and the second radio access node 222 each are connected to the pool 235 of core network nodes 231, 232.

The first radio access node 212 is configured to, e.g. by means of a selecting module 710 configured to, based on whether or not the second radio access node 222 is connected to the first core network node 231 select an interface for signalling handover of the user equipment 210 among the first interface 240 interfacing the first radio access node 212 and the first core network node 231, and the second interface 250. The second interface 250 is an interface between the first radio access node 212 and the second radio access node 222.

When the second radio access node 222 is connected to the first core network node 231, the first radio access node 212 is further configured to select the second interface 250 for signalling handover of the user equipment 210.

When the second radio access node 222 is not connected to the first core network node 231, the first radio access node 212 is further configured to select the first interface 240 for signalling handover of the user equipment 210.

The selecting module 710 may be implemented by a processor 780 in the first radio access node 212.

The first radio access node 212 may be further configured to, e.g. by means of an obtaining module 720 configured to, obtain an identification of which core network nodes 232 the second radio access node 222 is connected to.

The first radio access node 212 may be configured to obtain the identification of which core network nodes 232 the second radio access node 222 is connected to by receiving the identification of which core network nodes 232 the second radio access node 222 is connected to from the second radio access node 222, e.g. in any one or more out of: an X2 Setup request, an X2 Setup response and an eNB configuration update.

The obtaining module 720 may be implemented by a receiver in the first radio access node 212.

The first radio access node 212 may be further configured to, e.g. by means of a determining module 730 configured to, determine whether or not the second radio access node 222 is connected to the first core network node 231 based on the obtained identification.

The determining module 730 may be implemented by the processor 780 in the first radio access node 212.

The first radio access node 212 may be further configured to, e.g. by means of a sending module 740 configured to, send to the first core network node 231 the identification of which core network nodes 232 the second radio access node 222 is connected to.

In some embodiments the first radio access node 212 is further configured to send to the second radio access node 222 an identification of which core network nodes 231 the first radio access node 212 is connected to, e.g. in any one or more out of: an X2 Setup request, an X2 Setup response and an eNB configuration update.

The sending module 740 may be implemented by a transmitter in the first radio access node 212.

The embodiments herein for preparing handover of the user equipment 210 in the wireless communications network 200 may be implemented through one or more processors, such as the processor 780 in the first radio access node 212 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first radio access node 212. One such carrier may be in the form of a CD ROM disc. It is however feasible with other data carriers such as a memory stick. The computer program code may furthermore be provided as pure program code on a server and downloaded to the first radio access node 212.

Thus, the methods according to the embodiments described herein for the first radio access node 212 may be implemented by means of a computer program product, comprising instructions, i.e., software code portions, which, when executed on at least one processor, cause the at least one processor to carry out the actions described herein, as performed by the first radio access node 212. The computer program product may be stored on a computer-readable storage medium. The computer-readable storage medium, having stored there on the computer program, may comprise the instructions which, when executed on at least one processor, cause the at least one processor to carry out the actions described herein, as performed by the first radio access node 212. In some embodiments, the computer-readable storage medium may be a non-transitory computer-readable storage medium.

Those skilled in the art will also appreciate that the selecting module 710, the obtaining module 720, the determining module 730, and the sending module 740 described above may refer to a combination of analogue and digital circuits, and/or one or more processors configured with software and/or firmware, e.g. stored in a memory 790, that when executed by the one or more processors such as the processor 780 perform as described above. One or more of these processors, as well as the other digital hardware, may be included in a single ASIC, or several processors and various digital hardware may be distributed among several separate components, whether individually packaged or assembled into a SoC.

Figure 8:
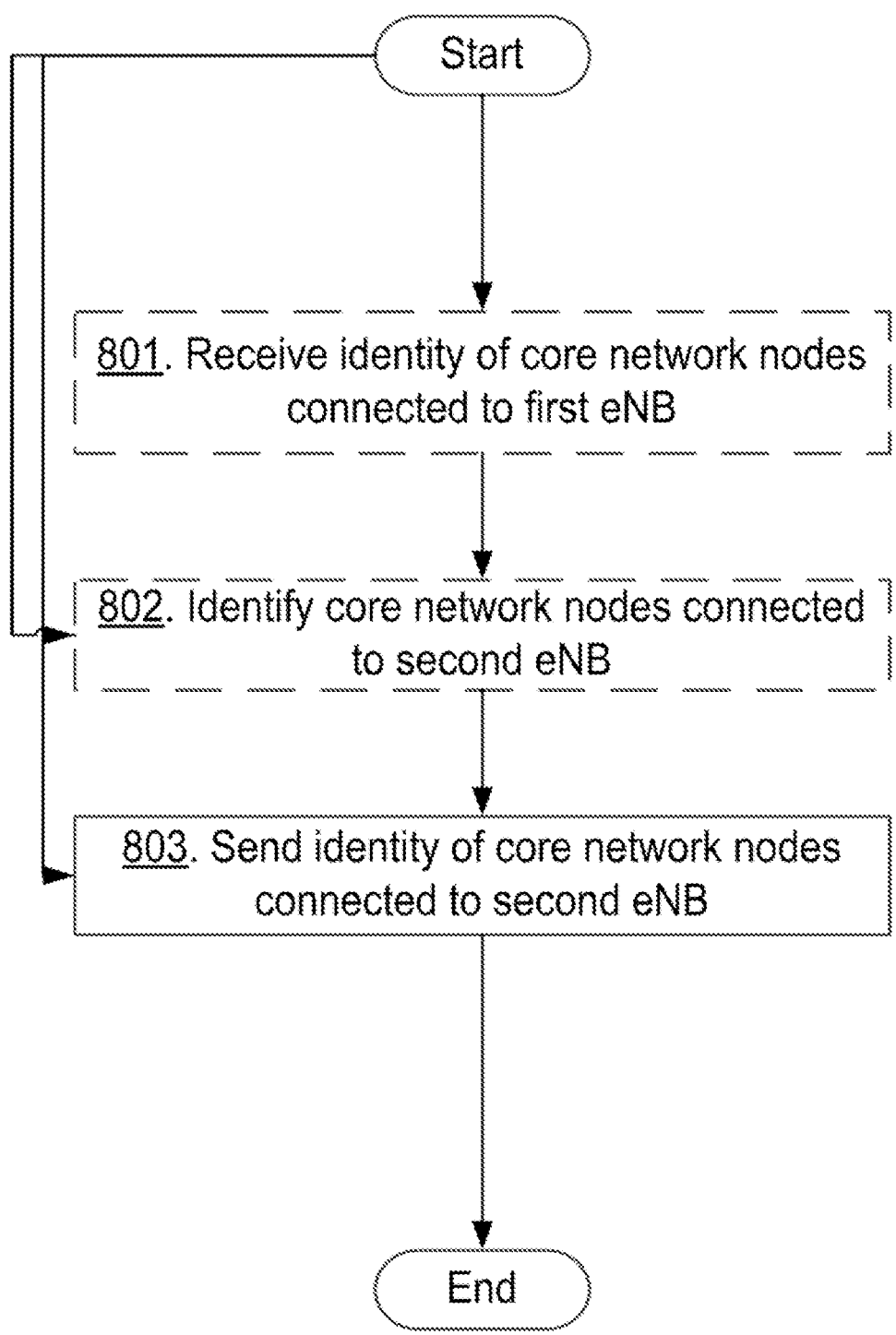
FIG. 8 is a flowchart illustrating embodiments of a method in a second radio access node.

FIG. 8 is a flow chart that illustrates embodiments of a method in the second radio access node 222 for assisting the first radio access node in preparing handover of the user equipment 210 in the wireless communications network 200. As mentioned above, the user equipment 210 is to be handed over from being served by the first radio access node 212 to being served by the second radio access node 222.

Further, the first radio access node 212 is connected to the first core network node 231 serving the user equipment 210.

The first radio access node 212 and the second radio access node 222 may each be connected to the pool 235 of core network nodes.

The method comprises the following actions, which actions may be taken in any suitable order.

Action 801

In some embodiments the second radio access node 222 receives the identification of which core network nodes 231 the first radio access node is connected to, e.g. in any one or more out of an X2 Setup request, an X2 Setup response and an eNB configuration update from the first radio access node 212.

The second radio access node 222 may store the identification of which core network nodes 231 the first radio access node is connected to.

This action is related to actions 401a, 403b and 501 above.

Action 802

In some embodiments the second radio access node 222 identifies which core network nodes 232 the second radio access node 222 is connected to. The identification may be triggered by receiving the X2 Setup request message from the first radio access node or by an intention to send the X2 Setup request, the X2 Setup response and/or the eNB configuration update to the first radio access node 212.

Action 803

The second radio access node 222 sends to the first radio access node 212, the identification of which core network nodes 232 the second radio access node 222 is connected to, enabling the first radio access node to prepare the handover of the user equipment 210.

The second radio access node 222 may send the identification of which core network nodes 232 the second radio access node 222 is connected to in any one or more out of: the X2 Setup request, the X2 Setup response and the eNB configuration update.

This action is related to actions 301, 403a, 401b, 405 and 502 above.

Figure 9:
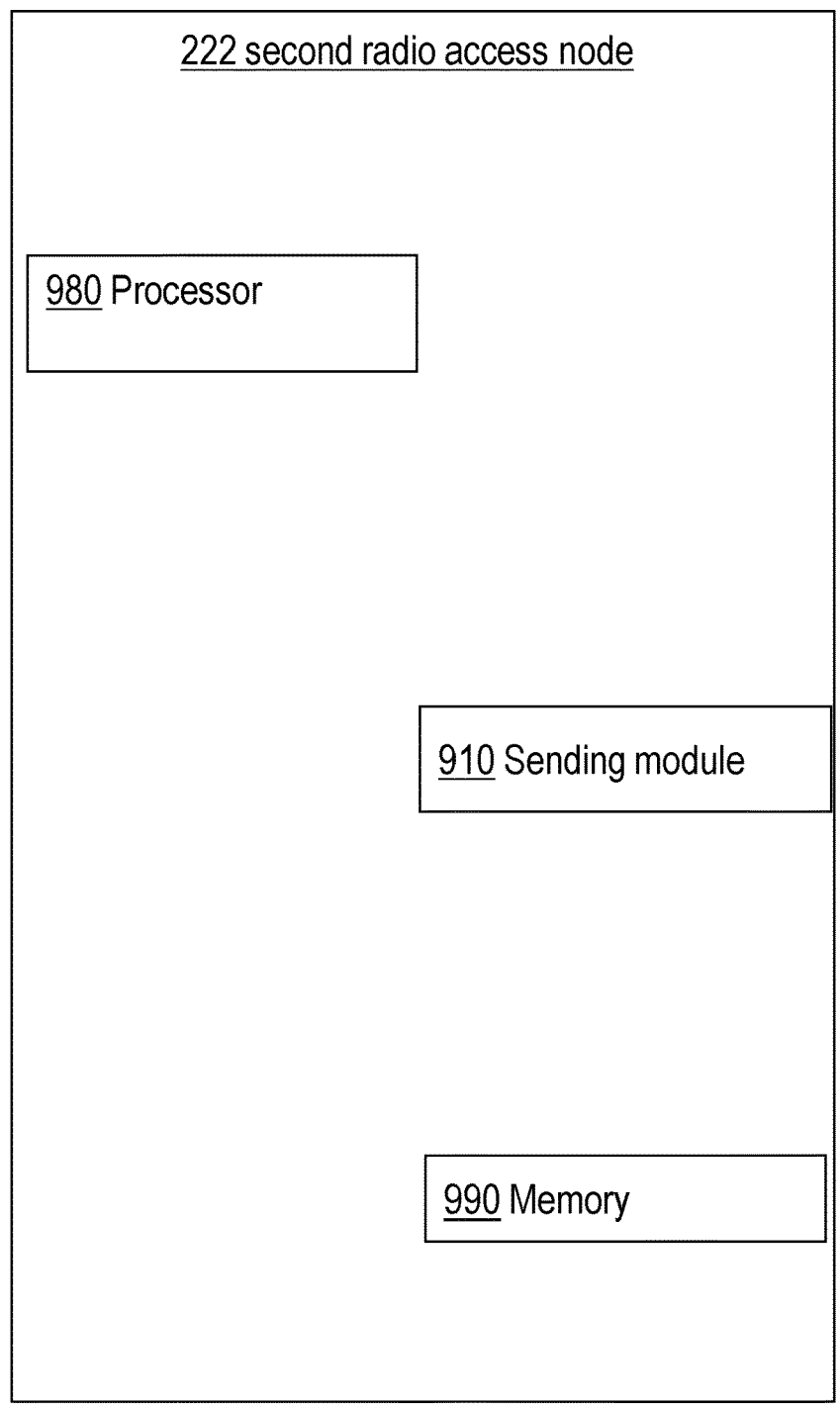
FIG. 9 is a schematic block diagram illustrating embodiments of a second radio access node.

To perform the method actions for assisting the first radio access node 212 in preparing handover of the user equipment 210 in the wireless communications network 200 described above in relation to FIG. 8, the second radio access node 222 comprises the following arrangement depicted in FIG. 9.

As mentioned above, the user equipment 210 is to be handed over from being served by the first radio access node 212 to being served by the second radio access node 222 when the first radio access node 212 is connected to the first core network node 231 serving the user equipment 210.

The second radio access node 222 is configured to, e.g. by means of a sending module 910 configured to, send to the first radio access node 212, an identification of which core network nodes 232 the second radio access node 222 is connected to, enabling the first radio access node to prepare the handover of the user equipment 210.

The second radio access node 222 may be configured to send the identification of which core network nodes 232 the second radio access node 222 is connected to in any one or more out of: an X2 Setup request, an X2 Setup response and an eNB configuration update.

The sending module 910 may be implemented by transmitter in the second radio access node 222.

The embodiments herein to preparing handover of the user equipment 210 in the wireless communications network 200 may be implemented through one or more processors, such as the processor 980 in the second radio access node 222 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the second radio access node 222. One such carrier may be in the form of a CD ROM disc. It is however feasible with other data carriers such as a memory stick. The computer program code may furthermore be provided as pure program code on a server and downloaded to the radio access node 222.

Thus, the methods according to the embodiments described herein for the second radio access node 222 may be implemented by means of a computer program product, comprising instructions, i.e., software code portions, which, when executed on at least one processor, cause the at least one processor to carry out the actions described herein, as performed by the second radio access node 222. The computer program product may be stored on a computer-readable storage medium. The computer-readable storage medium, having stored there on the computer program, may comprise the instructions which, when executed on at least one processor, cause the at least one processor to carry out the actions described herein, as performed by the second radio access node 222. In some embodiments, the computer-readable storage medium may be a non-transitory computer-readable storage medium.

Those skilled in the art will also appreciate that the sending module 910 described above may refer to a combination of analogue and digital circuits, and/or one or more processors configured with software and/or firmware, e.g. stored in a memory 990, that when executed by the one or more processors such as the processor 980 perform as described above. One or more of these processors, as well as the other digital hardware, may be included in a single ASIC, or several processors and various digital hardware may be distributed among several separate components, whether individually packaged or assembled into a SoC.

Figure 10:
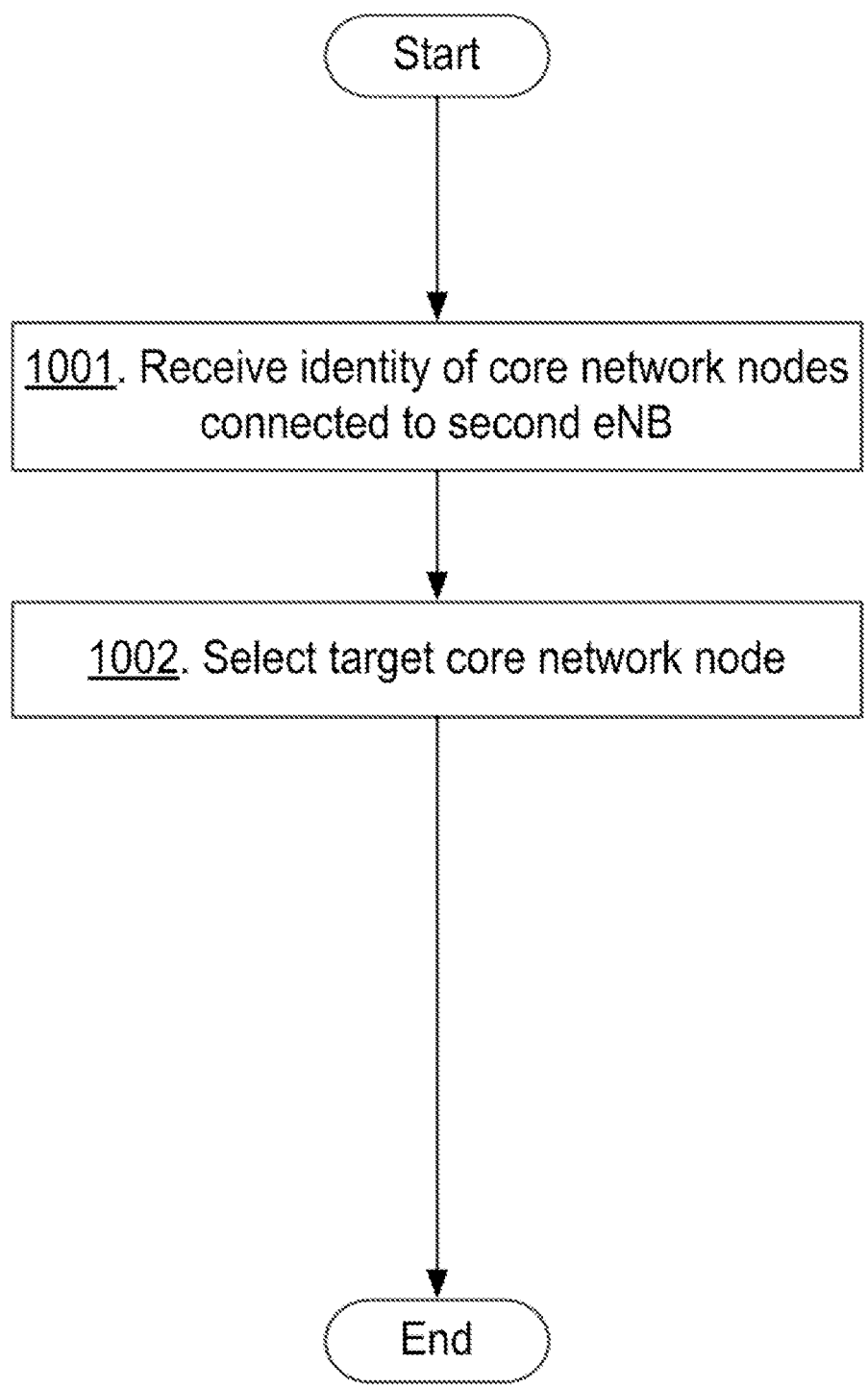
FIG. 10 is a flowchart illustrating embodiments of a method in a core network node.

FIG. 10 is a flow chart that illustrates embodiments of a method in the first core network node 231 for assisting the first radio access node in preparing handover of the user equipment 210 in the wireless communications network 200. As mentioned above, the user equipment 210 is to be handed over from being served by the first radio access node 212 to being served by the second radio access node 222. Further, the first radio access node 212 is connected to the first core network node 231 serving the user equipment 210.

The first radio access node 212 and the second radio access node 222 may each be connected to the pool 235 of core network nodes. The pool 235 of core network nodes comprises the first core network node 231 and the second core network node 232.

The method comprises the following actions, which actions may be taken in any suitable order.

Action 1001

The first core network node 231 receives from the first radio access node 212 an identification of which core network nodes 232 the second radio access node 222 is connected to.

The identification of which core network nodes 232 the second radio access node 222 is connected to may be received in a request to handover.

This action is related to actions 308 and 505 above.

Action 1002

The first core network node 231 selects the second core network node 232 as the target serving core network node, based on the identification of which core network nodes 232 the second radio access node 222 is connected to, enabling the first radio access node 212 to prepare handover of the user equipment 210.

This action is related to actions 309 above.

Figure 11:
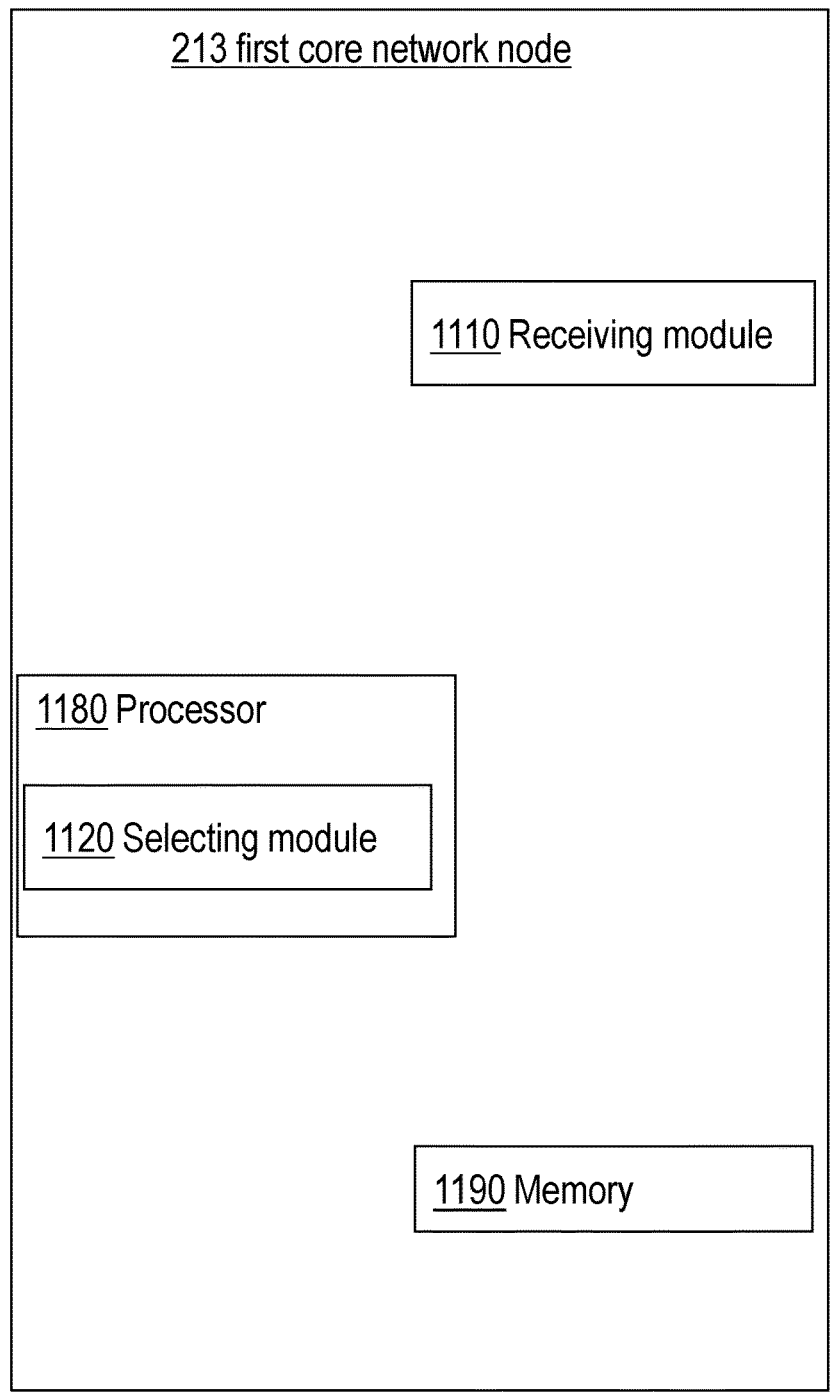
FIG. 11 is a schematic block diagram illustrating embodiments of a core network node.

To perform the method actions for assisting the first radio access node 212 in preparing handover of the user equipment 210 in the wireless communications network 200 described above in relation to FIG. 10, the first core network node 231 comprises the following arrangement depicted in FIG. 11.

As mentioned above, the user equipment 210 is to be handed over from being served by the first radio access node 212 to being served by the second radio access node 222. The first radio access node 212 is connected to the first core network node 231 serving the user equipment 210.

The first core network node 231 is configured to, e.g. by means of a receiving module 1110 configured to, receive from the first radio access node 212 an identification of which core network nodes 232 the second radio access node 222 is connected to.

The first core network node 231 may further be configured to receive the identification of which core network nodes 232 the second radio access node 222 is connected to in the request to handover.

The receiving module 1110 may be implemented by a receiver in the first core network node 231.

The first core network node 231 is further configured to, e.g. by means of a selecting module 1120 configured to, select the second core network node 232 as the target serving core network node, based on the identification of which core network nodes 232 the second radio access node 222 is connected to, enabling the first radio access node 212 to prepare handover of the user equipment 210.

The first core network node 231 may be configured to send the identification of which core network nodes 232 the second radio access node 222 is connected to in any one or more out of: an X2 Setup request, an X2 Setup response and an eNB configuration update.

The selecting module 1120 may be implemented by a processor 1180 in the first core network node 231.

The embodiments herein assisting the first radio access node 212 in preparing handover of the user equipment 210 in the wireless communications network 20 may be implemented through one or more processors, such as the processor 1180 in the first core network node 231 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the first core network node 231. One such carrier may be in the form of a CD ROM disc. It is however feasible with other data carriers such as a memory stick. The computer program code may furthermore be provided as pure program code on a server and downloaded to the core network node 231.

Thus, the methods according to the embodiments described herein for the first core network node 231 may be implemented by means of a computer program product, comprising instructions, i.e., software code portions, which, when executed on at least one processor, cause the at least one processor to carry out the actions described herein, as performed by the radio access node 212. The computer program product may be stored on a computer-readable storage medium. The computer-readable storage medium, having stored there on the computer program, may comprise the instructions which, when executed on at least one processor, cause the at least one processor to carry out the actions described herein, as performed by the core network node 231. In some embodiments, the computer-readable storage medium may be a non-transitory computer-readable storage medium.

Those skilled in the art will also appreciate that the receiving module 1110 and the selecting module 1120 described above may refer to a combination of analogue and digital circuits, and/or one or more processors configured with software and/or firmware, e.g. stored in a memory 1190, that when executed by the one or more processors such as the processor 1180 perform as described above. One or more of these processors, as well as the other digital hardware, may be included in a single ASIC, or several processors and various digital hardware may be distributed among several separate components, whether individually packaged or assembled into a SoC.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas encompassed within this disclosure.

Also note that terminology such as a first network node and a second network node should be considered to be non-limiting and does in particular not imply a certain hierarchical relation between the two.

The invention claimed is:

1. A method in a first radio access node for preparing handover of a user equipment in a wireless communications network, which user equipment is to be handed over from being served by the first radio access node to being served by a second radio access node, wherein the first radio access node is connected to a first core network node serving the user equipment, the method comprising:
    determining whether the second radio access node is connected to the first core network node;
    based on whether or not the second radio access node is connected to the first core network node, selecting an interface for signalling handover of the user equipment among:
    a first interface interfacing the first radio access node and the first core network node, and
    a second interface, which second interface is an interface between the first radio access node and the second radio access node, and sending to the first core network node the identification of which core network nodes the second radio access node is connected to, in response to determining that the second radio access node is not connected to the first core network node.

2. The method according to claim 1, further comprising:
obtaining an identification of which core network nodes the second radio access node is connected to, and
determining whether or not the second radio access node is connected to the first core network node based on the obtained identification.

3. The method according to claim 1, wherein the second radio access node is connected to the first core network node, and further comprising:
selecting the second interface for signalling handover of the user equipment.

4. The method according to claim 1, wherein the second radio access node is not connected to the first core network node, and further comprising:
selecting the first interface for signalling handover of the user equipment.

5. The method according to claim 1, wherein obtaining the identification of which core network nodes the second radio access node is connected to comprises receiving the identification of which core network nodes the second radio access node is connected to from the second radio access node in any one or more out of: an X2 Setup request, an X2 Setup response and an eNB configuration update.

6. The method according to claim 1, further comprising:
sending to the second radio access node an identification of which core network nodes the first radio access node is connected to, in any one or more out of: an X2 Setup request, an X2 Setup response and an eNB configuration update.

7. The method according to claim 1, wherein the first radio access node and the second radio access node each are connected to a pool of core network nodes.

8. A first radio access node for preparing handover of a user equipment in a wireless communications network, which user equipment is to be handed over from being served by the first radio access node to being served by a second radio access node when the first radio access node is connected to a first core network node serving the user equipment, and which first radio access node comprising a processor is configured to:
based on whether or not the second radio access node is connected to the first core network node select an interface for signalling handover of the user equipment among:
a first interface interfacing the first radio access node and the first core network node, and
a second interface, which second interface is an interface between the first radio access node and the second radio access node, and
send to the first core network node the identification of which core network nodes the second radio access node is connected to, in response to determining that the second radio access node is not connected to the first core network node.

9. The first radio access node according to claim 8, the processor is further configured to:
obtain an identification of which core network nodes the second radio access node is connected to, and
determine whether or not the second radio access node is connected to the first core network node based on the obtained identification.

10. The first radio access node according to claim 8, wherein the processor of the first radio access node is further configured to:
select the second interface for signalling handover of the user equipment when the second radio access node is connected to the first core network node.

11. The first radio access node according to claim 8, wherein the processor of the first radio access node is further configured to:
select the first interface for signalling handover of the user equipment in response to determining that the second radio access node is not connected to the first core network node.

12. The first radio access node according to claim 8, wherein the processor of the first radio access node is configured to obtain the identification of which core network nodes the second radio access node is connected to by receiving the identification of which core network nodes the second radio access node is connected to from the second radio access node in any one or more out of: an X2 Setup request, an X2 Setup response and an eNB configuration update.

13. The first radio access node according to claim 8, the processor is further configured to: send to the second radio access node an identification of which core network nodes the first radio access node is connected to, in any one or more out of: an X2 Setup request, an X2 Setup response and an eNB configuration update.

14. A method in a first core network node for assisting a first radio access node in preparing handover of a user equipment in a wireless communications network, which user equipment is to be handed over from being served by the first radio access node, to being served by a second radio access node, wherein the first radio access node is connected to the first core network node currently serving the user equipment, the method comprising:
receiving from the first radio access node an identification of which core network nodes the second radio access node is connected to wherein the first radio access node sends to the first core network node, the identification of which core network nodes the second radio access node is connected to, in response to determining that the second radio access node is not connected to the first core network node, and
selecting a second core network node as a target serving core network node, based on the identification of which core network nodes the second radio access node is connected to, enabling the first radio access node to prepare handover of the user equipment.

15. The method according to claim 14, wherein the identification of which core network nodes the second radio access node is connected to is received in a request to handover.

16. A first core network node for assisting a first radio access node in preparing handover of a user equipment in a wireless communications network, which user equipment is to be handed over from being served by the first radio access node to being served by a second radio access node, when the first radio access node is connected to the first core network node serving the user equipment, the first core network node comprising a processor is configured to:
receive from the first radio access node an identification of which core network nodes the second radio access node is connected to, wherein the first radio access node sends to the first core network node, the identification of which core network nodes the second radio access node is connected to, in response to determining that the second radio access node is not connected to the first core network node, and select a second core network node as a target serving core network node, based on the identification of which core network nodes the second radio access node is connected to, enabling the first radio access node to prepare handover of the user equipment.

17. The first core network node according to claim 16, the processor is further configured to receive the identification of which core network nodes the second radio access node is connected to in a request to handover.

* * * * *